United States Patent [19]
Yokota

[11] Patent Number: 5,987,003
[45] Date of Patent: Nov. 16, 1999

[54] COATED DISK SUBSTRATE HAVING A SMALL THICKNESS REGION

[75] Inventor: Shoji Yokota, Okayama, Japan

[73] Assignee: Mitsubishi Chemical Corporation, Tokyo, Japan

[21] Appl. No.: 08/896,168

[22] Filed: Jul. 17, 1997

[30] Foreign Application Priority Data

Jul. 23, 1996 [JP] Japan ................................. 8-193591

[51] Int. Cl.⁶ ............................. G11B 3/70; G11B 5/82
[52] U.S. Cl. ............................................. 369/280; 360/135
[58] Field of Search ............................. 369/94, 271, 272, 369/275.5, 277, 280, 282, 283, 286, 287, 288, 292; 360/97.1, 99.01, 131, 135

[56] References Cited

U.S. PATENT DOCUMENTS

| | | | |
|---|---|---|---|
| Re. 33,187 | 3/1990 | Alexander et al. | 369/280 |
| 850,494 | 4/1907 | Sanders | 369/288 |
| 1,316,894 | 9/1919 | Holmboe | 369/282 |
| 1,427,373 | 8/1922 | Gill | 369/283 |
| 1,891,227 | 12/1932 | Friebus | 369/18 |
| 2,050,366 | 8/1936 | Moss | 369/280 |
| 2,536,922 | 1/1951 | Durbrow | 369/280 |
| 4,482,903 | 11/1984 | Affolter | 369/287 |
| 4,546,464 | 10/1985 | Inoue et al. | 369/280 |
| 4,553,232 | 11/1985 | Covington et al. | 369/287 |
| 4,622,661 | 11/1986 | Hoogeveen et al. | 369/280 |
| 4,633,458 | 12/1986 | Tiefensee | 369/275.5 |
| 4,704,650 | 11/1987 | Yamamoto | 369/280 |
| 4,785,444 | 11/1988 | Nakane et al. | 369/282 |
| 4,903,255 | 2/1990 | Sugaya et al. | 369/286 |
| 5,128,922 | 7/1992 | Inui et al. | 369/284 |
| 5,257,154 | 10/1993 | Sato | 360/135 |
| 5,345,436 | 9/1994 | Higuchi | 369/280 |
| 5,759,332 | 6/1998 | Itoigawa et al. | 156/273.5 |

FOREIGN PATENT DOCUMENTS

| | | | |
|---|---|---|---|
| 0 566 032 | 10/1993 | European Pat. Off. | |
| 1080513 | 12/1954 | France | 369/282 |
| 227581 | 10/1910 | Germany | 369/280 |
| 38 39 536 | 6/1989 | Germany | |
| 43 02 384 | 7/1993 | Germany | |
| 56-68902 | 6/1981 | Japan | 369/280 |
| 6746 | of 1909 | United Kingdom | 369/280 |
| 473988 | 10/1937 | United Kingdom | 369/280 |

*Primary Examiner*—David L. Ometz
*Assistant Examiner*—Angel Castro
*Attorney, Agent, or Firm*—Oblon, Spivak, McClelland, Maier & Neustadt, P.C.

[57] ABSTRACT

A disk substrate for use in manufacturing a recording disk therefrom has an outer non-recording area, recording area, inner non-recording area and a central opening. The inner non-recording area includes a small thickness region having a thickness 70 to 90% of the thickness of the recording area and occupying an area 3 to 30% of the entire disk area including the central opening. The outer non-recording area has a large thickness region having a thickness larger than the thickness of the recording area. The disk substrate is free from warp and improves optical characteristics of the resultant disk.

7 Claims, 7 Drawing Sheets

COATED DISK SUBSTRATE HAVING A SMALL THICKNESS REGION

BACKGROUND OF THE INVENTION (a). Field of the Invention

The present invention relates to a coated disk substrate having a small thickness region and, more particularly, to an improved disk substrate capable of improving optical characteristics of optical storage medium.

(b). Description of the Related Art

Disk substrates for use in fabrication of optical storage media or optical disk are generally made by injecting a synthesized resin into a molding die assembly such as shown in FIG. 10 to have an annular shape.

The molding die assembly of FIG. 10 comprises a stationary die 5 and a movable die 6 coupled or clamped together to form therebetween a disk-shaped cavity 9. The stationary die 5 comprises a substantially cylindrical mirror plate 50 (first mirror plate) mounted on a die body not shown in the figure, and a sprue bush 54 inserted in the central cavity of the cylindrical mirror plate 50 and locked therein by way of a locking bush 52. The movable die 6 comprises a substantially cylindrical mirror plate (second mirror plate) 60 mounted on a movable die body not shown, a cylindrical inner stamper holder 65 disposed in the central cavity of the mirror plate 60 for holding the inner edge of a stamper, and a cut-out punch 64 inserted in the central cavity of the inner stamper holder 65 and locked therein by way of a locking bush 62.

In operation of the molding die assembly, an annular stamper 7 is disposed on the inner surface of the second mirror plate 60, and is fixed at the inner edge thereof by the inner stamper holder 65 and fixed at the outer edge thereof by a cavity outer ring 8 disposed on the outer surface of the first mirror plate 50.

Molten resin is injected into the cavity 9 through a resin path 55 formed in the sprue bush 54, and compression-molded in the cavity 9 to form a disk substrate. In the molding step, the stamper 7 provides the geometry of the recording area of the disk substrate having a pattern for pits and grooves, whereas the cut-out punch 64 provides a central opening of the disk substrate.

FIG. 11 shows the cross-section of a disk substrate manufactured by the molding die assembly of FIG. 10. The annular disk substrate has a recording area 2 and a non-recording area 3 disposed consecutively from the outer periphery toward the central opening of the disk substrate on one side (recording side) of the disk substrate. Another non-recording area 1 may be also disposed in the vicinity of the outer periphery, as shown in the figure.

In FIG. 11, a dent 3c is formed adjacent to the outer periphery of the inner non-recording area 3, the dent 3c having a cross-section either trapezoid, oblong, semicircle or semi-ellipse depending on the geometry of the molding die. The dent 3c is formed by the rim 6c of the inner stamper holder 65 protruding therefrom for holding the stamper 7. The dent 3c is subjected to a stress concentration due to an external force during a sputtering process for depositing a recording layer or protective layer or after mounting the disk on a driving hub, the stress concentration causing a warp in the disk substrate. The warp may reduce the servo characteristics of the resultant optical disk due to a local optical strain or inclination of the recording surface of the disk.

SUMMARY OF THE INVENTION

It is an object of the present invention to provide a coated disk substrate wherein a high rigidity of the disk substrate is maintained to reduce the warp in the resultant recording disk during manufacture thereof or after mounting the recording disk on a driving hub, for improving the optical characteristics of the recording disk fabricated from the disk substrate.

The present invention provides a disk substrate for use in manufacturing a recording disk comprising an outer non-recording area, a recording area, an inner non-recording area and a central opening area consecutively arranged from an outer periphery to a center of the disk substrate, the disk substrate having a first thickness in the recording area, a second thickness equal to 70 to 96% of the first thickness in a part of the inner recording area which part occupies 3 to 30% of an entire surface area of one of the sides of the disk substrate including the central opening area, and a third thickness larger than the first thickness in a part of the outer non-recording area in the vicinity of the outer periphery.

In accordance with the present invention, the disk substrate less suffers from stress or warp in the disk substrate because of the improved rigidity thereof, thereby improving the optical characteristics of the optical disk fabricated from the disk substrate.

The above and other objects, features and advantages of the present invention will be more apparent from the following description, referring to the accompanying drawings.

DESCRIPTION OF THE PREFERRED EMBODIMENTS

Figure 1:
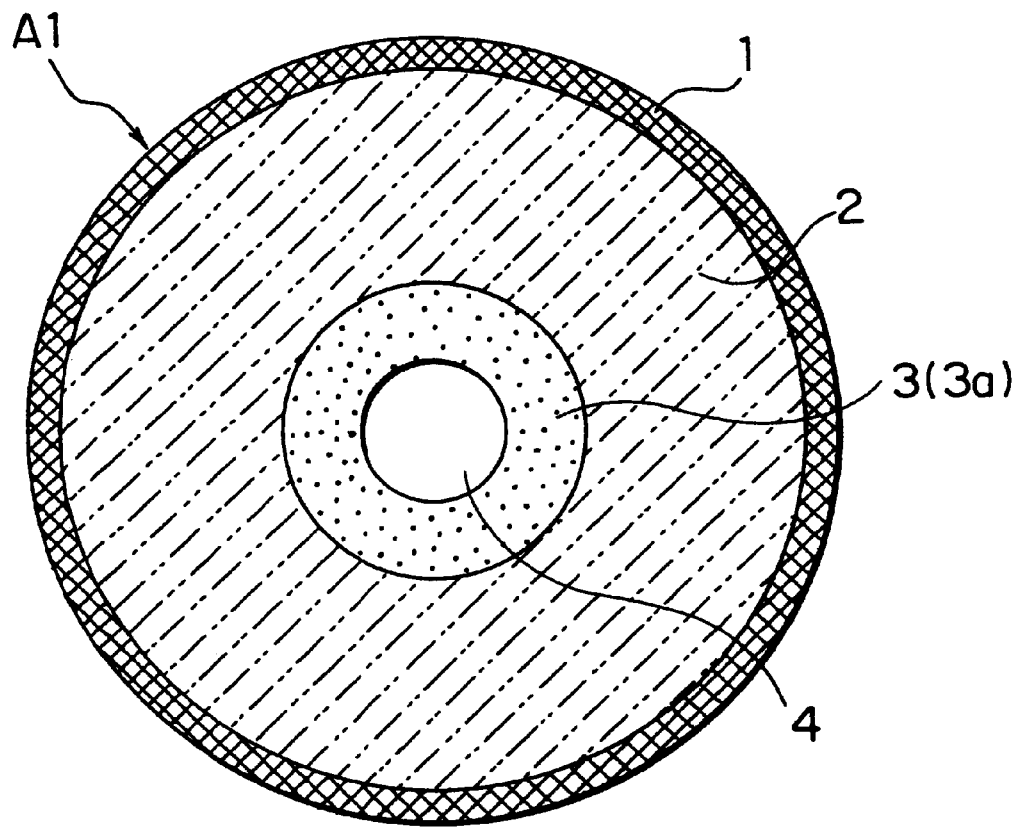
FIG. 1 is schematic top plan view of a disk substrate according to an embodiment of the present invention.

Now, the present invention is more specifically described with reference to accompanying drawings, wherein similar constituent elements are designated by the same or similar reference numerals.

Figure 2:
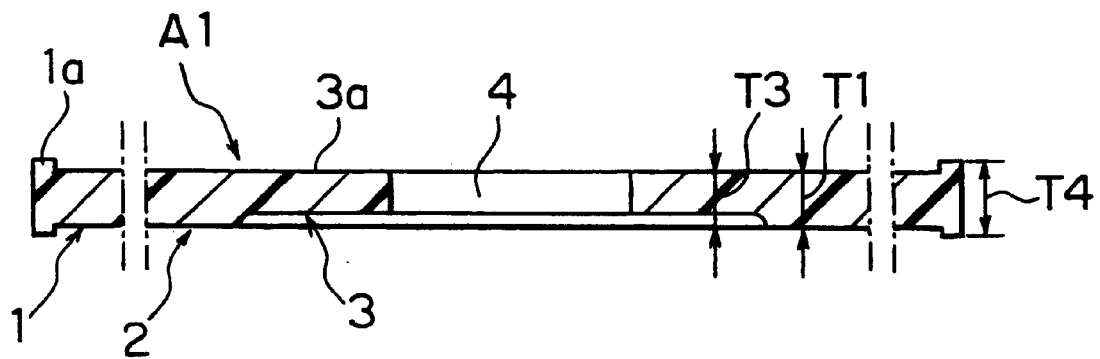
FIG. 2 is a sectional view of the disk substrate of FIG. 1

Referring to FIGS. 1 and 2 showing a recording side and a cross-section, respectively, of a disk substrate according to an embodiment of the present invention, the disk substrate A1 is of an annular shape having a central opening 4, and comprises an outer non-recording area 1, an optical recording area 2 and an inner non-recording area 3 consecutively disposed from the outer periphery of the recording side of the disk substrate A1. The disk substrate A1 is made of a synthetic resin such as polycarbonate resin, acrylic resin, polystyrene resin, polymethyl methacrylate resin, etc. The outer and inner diameters of the disk substrate A1 are determined according to a well-known standard of the disk.

The disk substrate of the first embodiment has a specific structure in both the inner non-recording area 3 and the outer non-recording area 1 according to the present invention. Specifically, the disk substrate A1 has a substantially flat surface in the inner non-recording area 3, on either one of the front surface (recording side) and back surface thereof, and a depression on the other of the front surface and back surface to form a small thickness region 3a in the inner non-recording area 3. The small thickness region 3a has a thickness T3 which is between 70% and 96%, preferably between 80% and 95%, of the thickness T1 of the disk substrate in the recording area 2. The flat surface and depression disposed on the opposite sides of the disk substrate A1 provide a sufficient rigidity for the disk substrate. The depression in the small thickness region 3a may be formed on the back surface of the disk substrate, although it is exemplarily formed on the front surface in the FIG. 2.

The flat surface in the non-recording area as used herein means a surface substantially flush with the surface of the recording area, and resides within a 40 . m deviation, preferably within a 20 $\mu$m deviation, from the surface of the recording area. The small deviation below 40 $\mu$m of the flat surface can be obtained by adjusting the location of a locking bush 54 shown in FIG. 4, as will be detailed later. The small thickness region 3a can be designed such that the thickness T3 of the small thickness region 3a is set between 1.0 and 1.2 mm, with the thickness T1 in the recording area 2 being set at 1.22 mm, for example. The small thickness region 3a having the flat surface and depression on both the surfaces thereof functions, to our surprise, for reducing the warp in the disk substrate A1 which would otherwise occur due to the stress concentration occurring during formation of the protective layer etc. and significantly reduces the birefringence of the disk surface. In our experiment, another small thickness region having depressions on both surfaces of the disk substrate could not provide such a reduction in the warp and birefringence.

It is important in the present invention that the small thickness region 3a has a certain width. The certain width can be defined in terms of the ratio of the area of the small thickness region 3a to the total area of the disk substrate. Specifically, the small thickness region 3a according to the present invention should have an area which is 3 to 30% of the total area of one side of the disk substrate including the area of the central opening 4, wherein the area of the small thickness region 3a does not include the area for the central opening 4. The small thickness region 3a preferably has an area which is 5 to 30% of the total area of the disk surface in case of the disk substrate having an outer diameter less than 100 mm, or an area which is 3 to 20% of the total area of the disk surface in case of the disk substrate having an outer diameter of 100 mm or above.

If the small thickness region 3a has an area lower than the area as specified above, the stress generated in the disk substrate can hardly be effectively dispersed, causing a warp in the disk substrate. On the other hand, if the small thickness has an area larger than the area as specified above, the disk substrate suffers from a lower strength in the vicinity of the inner periphery of the disk substrate. In the present invention, the specified range of the relative area of the small thickness region 3a advantageously prevents the warp in the disk substrate without degrading the rigidity of the disk substrate.

It may be considered that the small thickness region may cause deformation during the release of the disk substrate A1 from the molding die assembly in the manufacturing process. To effectively prevent the deformation, it is sufficient to improve the mold releasability by providing a surface roughness in a portion of the die surface, which may have an area corresponding to or larger than 20%, preferably larger than 50%, and more preferably larger than 80%, of the area of the small thickness region 3a. The surface roughness in terms of dimension of the displacement or protrusions in the surface of the resultant small thickness region 3a of the disk substrate should be 0.5 $\mu$m or above, preferably in the range between 0.5 $\mu$m and 100 $\mu$m, and more preferably in the range between 2 $\mu$m and 50 $\mu$m. The surface roughness is preferably provided in an annular region of the molding die within the small thickness region.

It is also important to provide a large thickness region 1a in the outer non-recording area 1, the large thickness region 1a having a specified structure and a thickness larger than the thickness of the disk substrate in the recording area 2. The large thickness region 1a in the outer non-recording area 1 should be disposed preferably between the outer periphery of the disk substrate and a radial position which is 3 mm apart therefrom, and more preferably between the outer periphery and a radial position which is 0.5 to 2 mm apart therefrom. The large thickness region 1a should have a thickness larger than the thickness in the recording area 2 by 10 $\mu$m or above, preferably by 20 to 200 $\mu$m, and more preferably by 30 to 100 $\mu$m.

In the present invention, the large thickness region 1a improves the rigidity of the disk substrate together with the small thickness region 3c to prevent deformation or warp in the disk substrate. It is sufficient that the large thickness region 1a have a thickness larger than the thickness in the recording area 2. The large thickness region 1a also functions for prevention of damage occurring on the disk surface of the recording area 2 by providing a gap between the recording area and other surfaces including the inner surface of a cartridge receiving the disk for rotation, for prevention of the direct contact therewith during the manufacturing step, shipment or operation of the disk.

Figure 3:
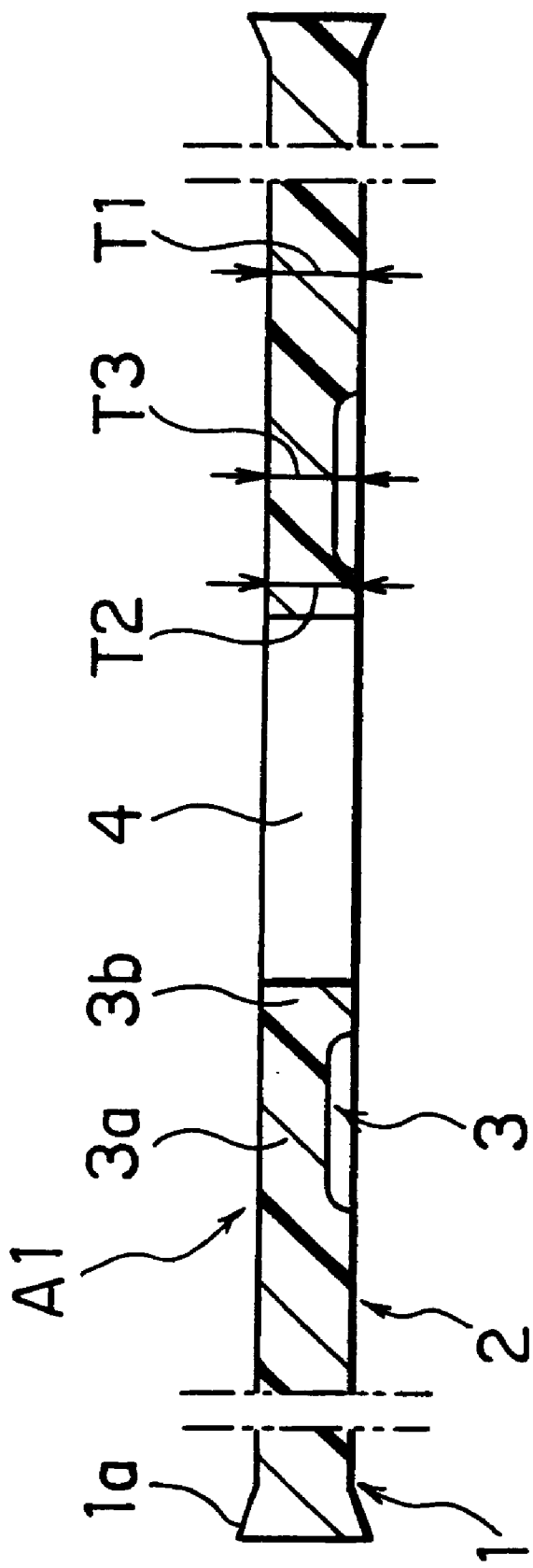
FIG. 3 is a sectional view of a disk substrate according to a second embodiment of the present invention.

In a preferred embodiment of the disk substrate according to the present invention, as shown in FIG. 3, the front surface of the non-recording area 3 is substantially flat in the inner edge portion 3b of the non-recording area 3 adjacent to the central opening 4, i.e., where the recording film is not formed, with the back surface of the entire inner non-recording area 3 being substantially flat, to thereby provide the inner edge portion 3b of the disk substrate having a thickness substantially equal to the thickness in the recording area 2. This configuration of the disk substrate A1 enables simplification of the geometry of the molding die and reduction of strain in the disk substrate.

Specifically, the disk substrate of FIG. 3 has a thickness T2 in the inner edge portion 3b of the inner non-recording area 3 between the central opening 4 and the small thickness region 3a, the thickness T2 being substantially equal to the thickness T1 of the recording area 2. The thickness T3 of the small thickness region 3a of the inner non-recording area 3 preferably ranges between 70% and 96%, and more preferably between 80% and 95%, of the thickness T1 of the recording area 2. The small thickness region 3a has an area which ranges between 3% and 30% of the total area of the disk substrate including the area of the central opening 4. To give a practical example, the thickness T1 of the recording area 2, the thickness T2 of the inner edge portion 3b of the inner non-recording area and the thickness T3 of the small thickness region 3a are 1.2 mm, 1.2 mm and 1.0 to 1.1 mm, respectively.

It is important that the large thickness region 1a is provided in the vicinity of the outer periphery of the disk substrate. The large thickness region 1a resides within the outer non-recording area 1 between the outer periphery of the disk substrate and a radial position which is 3 mm apart therefrom, preferably between the outer periphery and a radial position which is 0.5 to 2 mm apart from the outer periphery. The large thickness region 1a has a thickness larger than the thickness of the recording area 2 by 10 $\mu$m (or 0.8%), preferably 20 to 200 $\mu$m (or 1.6 to 17%), and more preferably 30 to 100 $\mu$m (or 2.5 to 8.3%).

Figure 4:
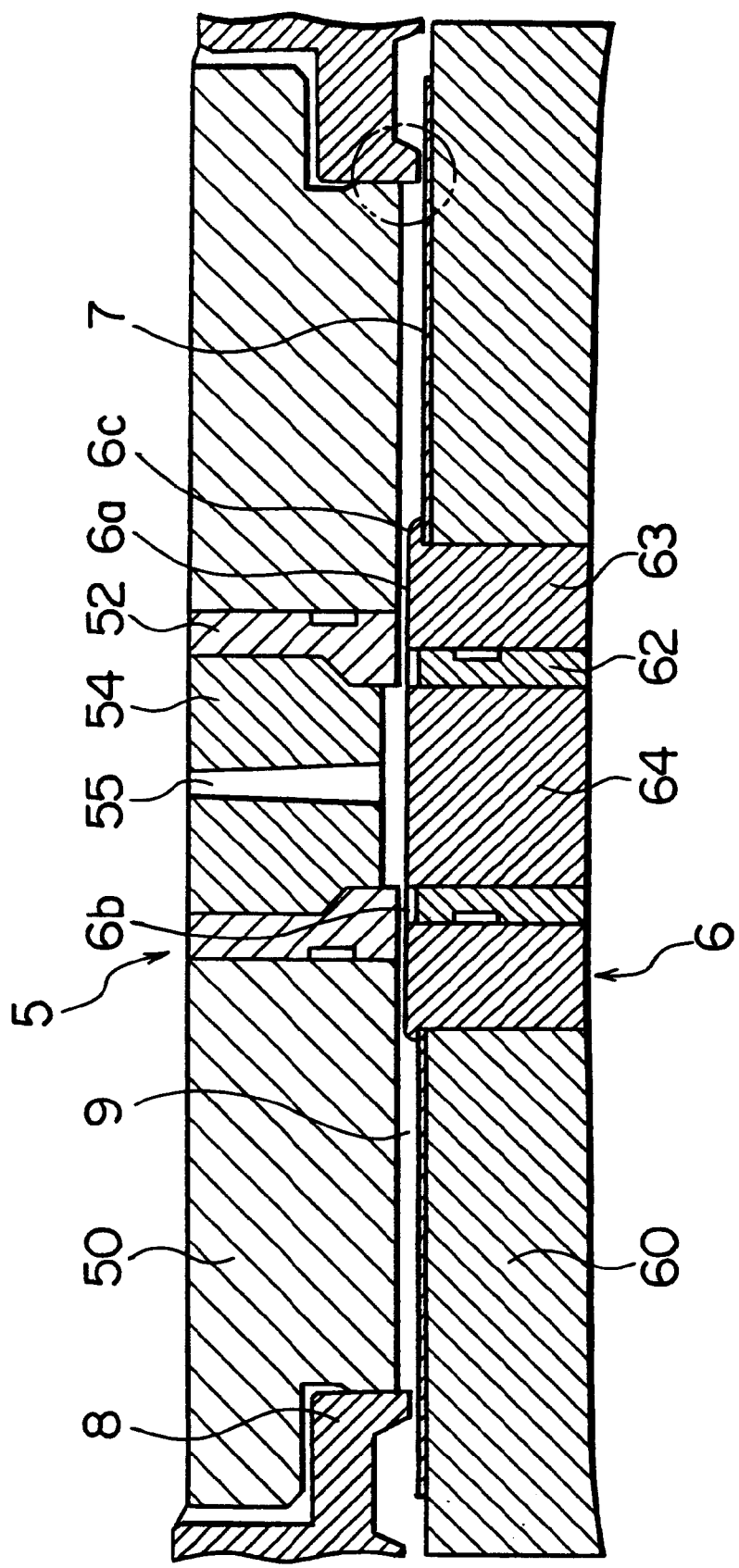
FIG. 4 is a sectional view of a molding die assembly for manufacturing the disk substrate of FIG. 3.
Figure 5:
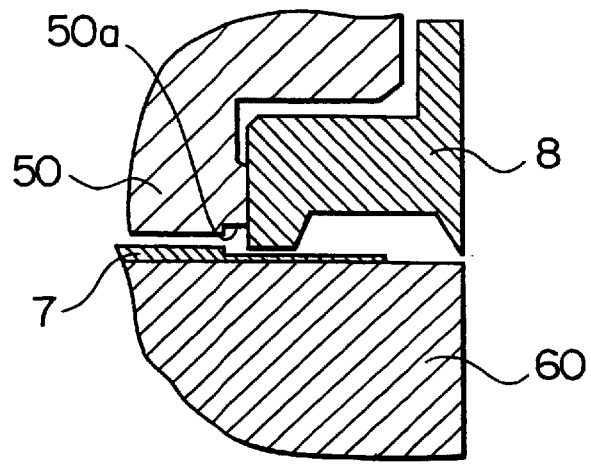
FIG. 5 is a partially enlarged view of a portion of the molding die assembly of FIG. 4.

FIG. 4 shows a molding die assembly for use in manufacturing the disk substrate of FIG. 3 according to the second embodiment, and FIG. 5 shows details of the portion of the molding die assembly encircled in FIG. 4. The molding die assembly of FIG. 4 is similar to the conventional molding die assembly of FIG. 10 except for an improved inner stamper holder 63 being provided on the movable die 5 in FIG. 4.

Specifically, the molding die assembly of FIG. 4 comprises a stationary die 5 and a movable die 6 coupled or clamped together to form a disk-shaped cavity 9 therebetween. The stationary die 5 comprises a first mirror plate 50 having a substantially cylindrical shape, and a sprue bush 54 inserted in the central opening of the first mirror plate 50 and locked therein by way of the locking bush 52. A molten resin is injected into the cavity 9 through the resin path 55 formed in the central portion of the sprue bush 54. The movable die 6 comprises a substantially cylindrical second mirror plate 60, a substantially cylindrical inner stamper holder 63 disposed in the central opening of the second mirror plate 60, and a cut-out punch disposed in the central opening of the inner stamper holder 63 and locked therein by way of a locking bush 62. The cut-out punch 64 is used for forming the central opening of the disk substrate.

A stamper 7 having thereon a pattern for pits and grooves is disposed in the cavity 9 and fixed by the cylindrical wall of the inner stamper holder 63 at the inner edge of the stamper 7 in the horizontal direction, and thrust in the vertical direction against the mirror plate 60 at the inner edge portion by the annular rim 6c of the inner stamper holder 63. Although the details are not specifically shown in the figure, a multiplicity of cooling slots are formed in both the mirror plates 50 and 60, a plurality of suction paths are formed in the second mirror plate 60 for attaching the stamper 7 to the mirror plate 60, and a cavity outer ring 8 is disposed on the outer wall of the first mirror plate 50 for fixing the outer periphery of the stamper 7.

Figure 10:
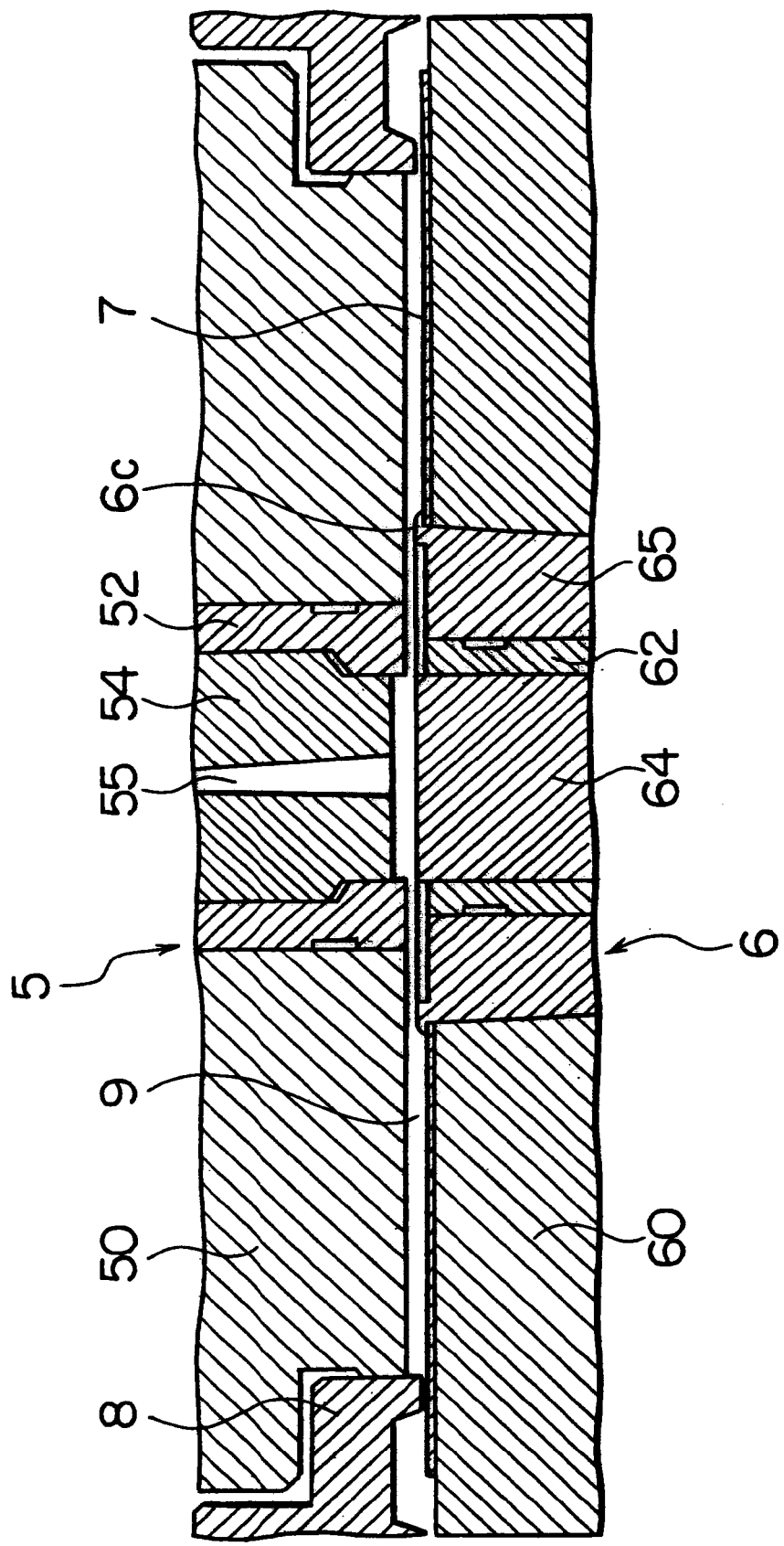
FIG. 10 is a sectional view of a conventional molding die assembly for manufacturing a conventional disk substrate.

The end surface 6a of the inner stamper holder 63 including the annular rim 6c is substantially flat and slightly protrudes into the cavity 9 from the end surface of the stamper 7, which is different from the conventional die assembly of FIG. 10 wherein only the annular rim 6c protrudes into the cavity 9. Alternatively, the annular rim 6c may further protrude from the end surface of the inner stamper holder 63.

The thickness T3 of the small thickness region 3a of the inner non-recording area 3 is determined by the amount of protrusion of the end surface 6a of the inner stamper holder 63, whereas the area of the small thickness region 3a is determined by the width of the end surface 6c, i.e., the distance between the outer wall and inner wall, of the inner stamper holder 63. By designing the thickness of the inner edge portion 3b of the non-recording area 3 to be substantially equal to the thickness of the recording area 2, the mechanical strength of the disk substrate A1 can be further improved. The inner edge portion 3b is formed by an annular cavity portion 6b defined by the deviation of the end surface of the lock bush 62 with respect to the end surface 6a of the inner stamper holder 3.

Referring to FIG. 5, the large thickness region 1a can be formed by modifying the radially outer portion of the molding die assembly such that a notch or step portion 50a is formed on the first mirror plate 50 adjacent to the cavity outer ring 8, with the outer periphery of the stamper 7 being thinner than the other portion of the stamper 7, to thereby form a large thickness portion of the cavity 9 at the periphery thereof.

As another method for forming the large thickness region 1a of the disk substrate, a rapid cooling for the molten resin may be used. This rapid cooling may be implemented merely by selectively cooling the cavity outer ring 8, wherein molten resin in the cavity 9 is cooled rapidly in the vicinity of the outer edge of the disk substrate to form the large thickness region 1a in the resultant disk substrate at the outer periphery thereof.

The disk substrate A1 shown in FIGS. 1 and 2 can be formed by aligning the end surface of the lock bush 62 with the end surface 6a of the inner stamper holder 63. The large thickness region 1a itself may have any form such as a rectangular shape in cross-section (FIG. 2) or a taper (FIG. 3) having a larger thickness as viewed toward the periphery. The large thickness region 1a may be formed by one of the front and back surfaces of the disk substrate protruding from the surface of the adjacent region and the other (front surface, i.e., recording side, for example) forming a flat surface. The structure wherein only the back surface has a protrusion is preferable when a pair of disk substrates are bonded together to form a bonded disk having an air sandwich structure.

Figure 6:
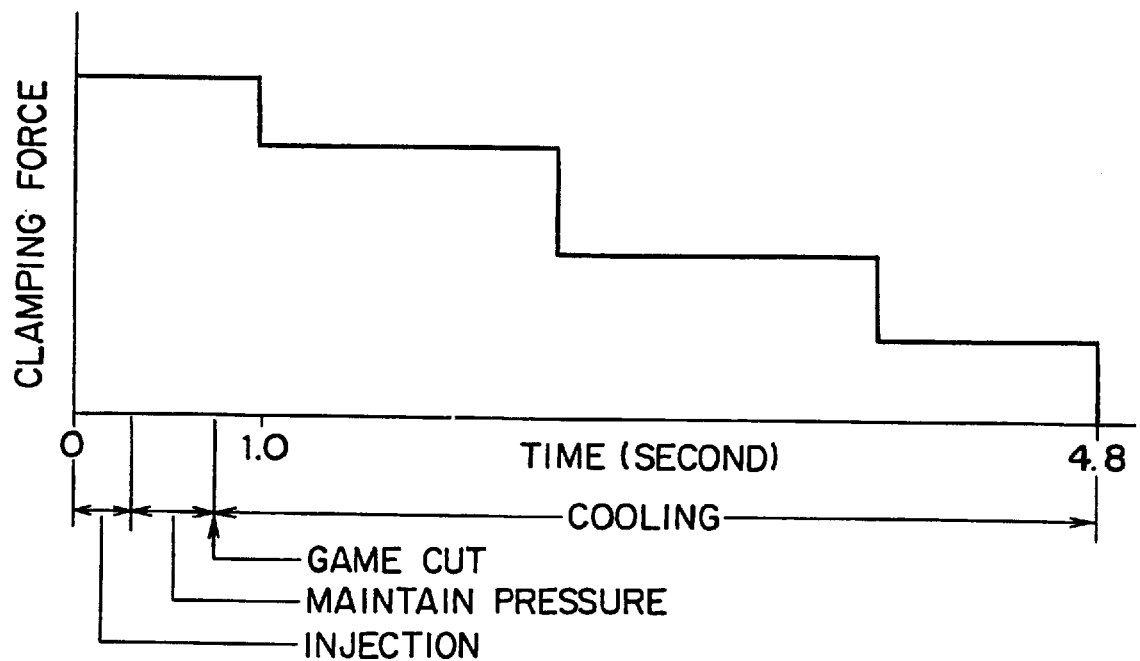
FIG. 6 is a timing chart of a manufacturing process of the disk substrate of FIG. 3 by using the molding die assembly of FIG. 4.

The disk substrate according to the present invention can be formed by the molding die assembly as described above by using a process such as shown in FIG. 6. In the process, a clamping force is applied for closing the movable die 6 against the stationary die 5 to provide a pressure to the surface of the disk substrate between about 100 kg/cm$^2$ and 600 kg/cm$^2$, preferably between 300 kg/cm$^2$ and 500 kg/cm$^2$. Subsequently, a molten resin heated up to about 300 to 350° C. is injected into the cavity 9 through the resin path 55 of the sprue bush 54 within about 1.0 second, with the die temperature set between about 80 and 120° C.

After maintaining the pressure for about 0.8 second for compression-molding the disk substrate to which a pre-format pattern is transferred from the stamper 7, a gate-cut is effected, the sprue bush 54 is retracted, and the cut-out punch is advanced to form a central opening 4 by punching. Thereafter, the clamping force is reduced in steps and the disk substrate is taken out as a product from the die assembly by retracting the movable die 6 relative to the stationary die 5 after about 4.8 seconds elapsed since the start of the mold injection.

The disk substrate A1 according to the present invention can be used as variety of disks such as a compact disk (CD), video disk (VD), CD-ROM disk etc., which may be an optical ROM disk, write-once optical disk, or rewritable optical disk. The disk substrate manufactured as described above can have any known structure such as an air-sandwich structure, all-surface bonded structure or single plate coating structure.

Figure 7:
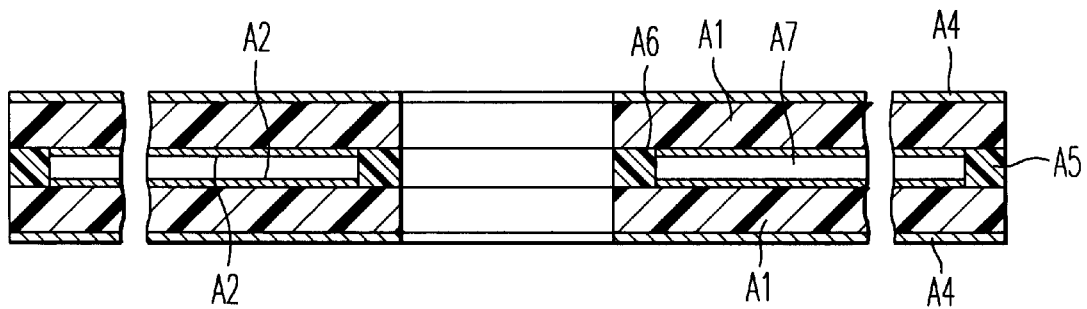
FIGS. 7 to 9 are sectional views of optical disks each manufactured from a disk substrate according to an embodiment of the present invention.

FIG. 7 shows the air-sandwich structure as mentioned above, wherein both sides of the disk are used as the recording area. The air-sandwich disk is formed by bonding two disk substrates A1 and A1 together, each of which has a recording layer A2 on one side thereof and a protective layer A4 on the other side thereof.

Between both the disk substrates A1 and A1 are interposed a pair of annular spacers A5 and A6 at the outer edge portion and inner edge portion, respectively, of the bonded disk to thereby form an air spacer A7 between both the annular spacers A5 and A6. By this configuration, the recording layers A2 and A2 are opposed to each other with the air spacer A7 interposed therebetween.

Figure 8:
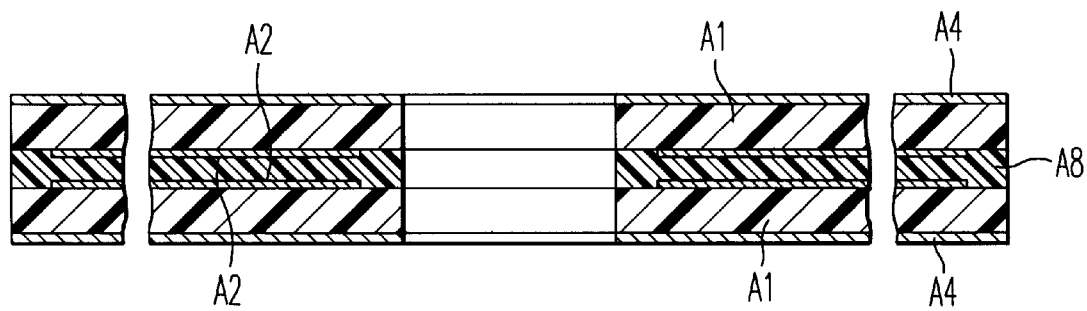

FIG. 8 shows a all-surface bonded structure as mentioned above. The all-surface bonded disk shown in the figure has two recording surfaces, although other type of all-surface bonded disk may have a single recording surface. The all-surface bonded disk of FIG. 8 is formed by bonding two disk substrates A1 and A2 together with an adhesive layer A8, each of the disk substrates A1 and A1 having a recording layer A2 on one side thereof and a protective layer A4 on the other side thereof, similarly to the air-sandwich disk. Both the recording layers A2 and A2 are opposed to each other with the adhesive layer A8 interposed therebetween.

Alternatively, the all-surface bonded disk may have a disk substrate A1 having a recording layer A2 on one side thereof and a small thickness region formed by a depression disposed on the opposite side, and a dummy substrate bonded to the disk substrate A1. The dummy substrate has a pair of annular protrusions to be bonded to the disk substrate A1 at the locations adjacent to the depression of the disk substrate A1.

Figure 9:
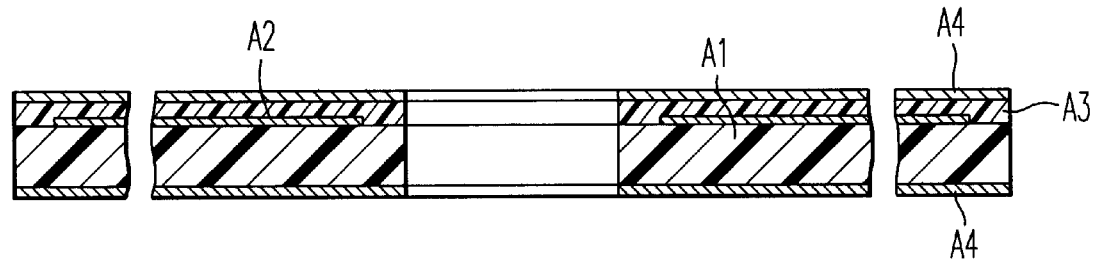

FIG. 9 shows a single-plate coating structure as mentioned before, wherein a recording layer A2 and protective layer A3 are consecutively formed on one side of the disk substrate A1 according to the embodiment, and an overcoat layer A4 is formed on each side of the disk substrate A1.

In each of the disk structures as described above, the recording layer A2 is formed on the front side or recording surface 2 of the disk substrate A1. The recording layer A2, which is implemented as a reflective layer, is generally made of a high reflectance metal such as Al and Au in case of a ROM disk, a low melting point metal such as Te in case of a recordable disk, or an amorphous magnetic alloy made of rare earth metal and transition metal such as TbFe, TbFeCo, TbCo and DyFeCo or polycrystalline vertically magnetizable film such as MnBi and MnCuBi in case of a magneto-optical disk. The recording layer in the magneto-optical disk maybe a single layer as well as a double layer which may be GdTbFe/TbFe.

The protective layer A4 may be made of a so-called hard-coat material such as energy ray (ultra-violet ray, for example) curable resin and thermosetting resin. Preferable energy ray curable resin is selected from resins containing as a main component thereof acrylates such as epoxy acrylate and urethane acrylate or compounds having one or more of methacrylate radicals. Examples of the thermosetting resins include silicon based, epoxy based and titanium based resins.

A driving hub is generally attached to the disk substrate A1 at the central opening 4, depending on the type of disk.

In the disk substrate A1 according to the present invention, after it is fabricated into a disk such as mentioned above, a residual stress generally remains in the disk substrate due to a stress relaxation generated by thermal change in the disk substrate, film stress or pressurized lamination resulting from the formation of a recording layer A2, protective layer A3, over-coat layer A4 or adhesive layer A8. Moreover, another stress is also generated during bonding attachment of the driving hub to the central opening. The small thickness region, however, disposed as a part of the non-recording area according to the present invention functions for dispersing the stress in the disk substrate, whereby generation of a warp in the disk substrate is suppressed. Moreover, the large thickness region 1a formed in the outer periphery of the outer non-recording area increases the rigidity of the disk substrate to thereby further prevent the deformation or warp in the disk substrate.

Specifically, the disk substrate according to the present invention is less subjected to a warp due to a structure free from a stress concentration, and accordingly, is free from a local optical strain or birefringence to have improved optical characteristics. Moreover, the structure of the disk substrate free from the warp provides excellent servo characteristics even when used in a single plate disk. Further, the structure free from the warp provides a strong resistance against exfoliation in a laminate structure formed by bonding. The preferred structure of the present invention wherein the inner edge portion of the non-recording area has a thickness substantially equal to the thickness of the recording area provides a suitable rigidity to the disk substrate whereby vibration or whirling of the disk is reduced during a high-speed rotation or the disk.

The disk substrate according to the present invention can be used for any type of disk. It is particularly suited for a disk incorporating a large elastic material such as polycarbonate resin. The disk substrate can be formed by an ordinary injection molding technique as well as by the compaction molding technique as described before.

EXAMPLES

Examples of the disk substrate according to the present invention as shown in FIGS. 2 and 3 were manufactured, and comparative examples were also manufactured which had no large thickness region in the outer periphery of the disk substrate. Both types of examples were fabricated to single plate coating disks. The resultant disks were measured in their flatness and birefringence. The results exhibited excellent characteristics of the examples of the disks according to the present invention, as detailed below.

Example 1

Example 1 of the disk shown in FIG. 2 was made from polycarbonate, wherein the diameter $D_1$ of the outer periphery, diameter $D_2$ of the inner periphery, thickness $T_1$ in the recording area, thickness $T_3$ of the small thickness region in the inner non-recording area, ratio (percentage) $P_1$ of the area of the small thickness region with respect to the total area of one side of the disk substrate including the area of the central opening, and thickness $T_4$ of the large thickness portion disposed between the outer periphery of the disk substrate and a radial position 1.0 to 2.0 mm apart therefrom are such that $D_1=86$ mm, $D_2=15$ mm, $T_1=1.2$ mm, $T_3=1.0$ mm, $P_1=9.5\%$, and $T_4=1.22$ mm. The disk substrate had a surface roughness $Ra=5$ $\mu$m on the surface formed by the pattern of the stamper in the annular region disposed between the circles having diameters of 23 mm and 35.7 mm.

A 2000-angstrom thick Al film was formed on the disk substrate by sputtering onto the recording side of the disk substrate (bottom surface as viewed in FIG. 2) to form a recording layer, which was coated with a protective layer made of an acrylic ultra-violet ray curable resin having a 10 $\mu$m thickness, followed by coating of the opposite side (top surface as viewed in FIG. 2) of the disk substrate with a 5-$\mu$m thick overcoat layer made of an acrylic ultra-violet ray curable resin. The resultant disk was measured in its flatness and exhibited 0 $\mu$m. Thereafter, a driving hub having a flange of 22-mm diameter and a magnet attachment of 15-mm diameter was attached to the disk at the central opening 4, then fixed with a ultra-violet curable resin. The resultant disk was measured in its birefringence on the entire surface of the recording layer, and exhibited 3 nm at the maximum value.

The flatness was measured in terms of displacement with a laser interference meter (called VIDEO FLATNESS TESTER MODEL FT-7 from Nidec Corporation), wherein the displacements in the recording area (between radial positions of 23 mm and 41 mm) were measured with a resolution of 5 μm.

The birefringence was measured at five points in the radial direction and eight points in the circumferential direction in the recording area for each measurement. The birefringence in the disk substrate was measured with He—Ne laser parallel beams having a 633 nm wavelength which were incident in the vertical direction to the disk substrate. The results were obtained from the phase difference between the beams passing the disk substrate. The birefringence in the final product was measured with He—Ne parallel laser beams incident to the disk at an incident angle of 30 degrees. The results were obtained also from the phase difference between the beams reflected by the disk and calculation thereof to obtain the change in the birefringence of the disk substrate. The difference between the measured birefringences of both the disk substrate and the final disk fabricated therefrom was calculated to estimate the change in the birefringence during fabrication of the disk.

Example 2

Example 2 of the disk shown in FIG. 2 was manufactured similarly to Example 1 except for the thickness T3=1.1 mm of the small thickness region. The flatness and birefringence were measured similarly to the case of the first example. The results thus obtained are shown in table 1.

Example 3

Example 3 of the disk shown in FIG. 2 was manufactured similarly to Example 2 except for the inner edge portion of the disk adjacent to the central opening, which is located between the circles having diameters of 15 mm and 22 mm and had a thickness of 1.2 mm. The flatness and birefringence were measured similarly to Example 2, and the flatness exhibited 0 μm.

Comparative Example 1

Figure 11:
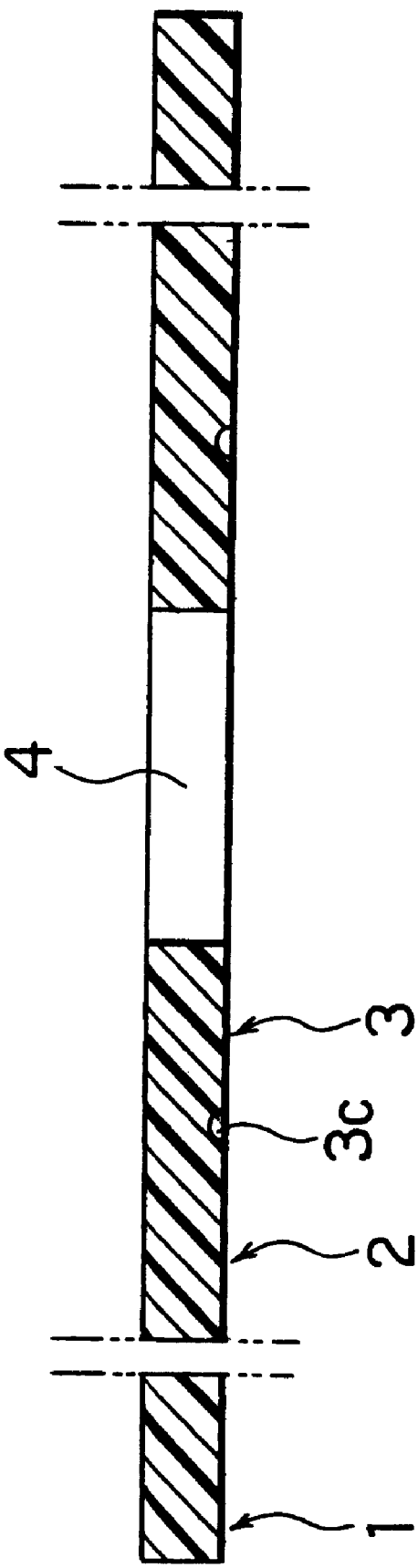
FIG. 11 is sectional view of a conventional disk substrate.

Comparative Example 1 of the disk shown in FIG. 11 was manufactured similarly to Example 1 except that a 0.2-mm deep dent 3c was formed instead of the small thickness region 3a in the inner non-recording area 3 at the outer periphery of the non-recording area 3 to thereby make the thickness of the disk substrate 1.0 mm at the dent 3c, which is located at the radial position of 18 mm. A disk similar to the disk fabricated from Example 1 was also fabricated from the Comparative Example 1, and measured in its flatness and birefringence similarly to the case of Example 1. The results were shown in table 1. In the Comparative Example 1, the area of the dent 3c corresponds to 1.5% with respect to the total area of one side of the disk substrate including the area of the central opening.

Comparative Example 2

Comparative Example 2 was manufactured similarly to the Example 1 except for the small thickness region which was formed by depressions formed on both surfaces of the disk substrate in Comparative Example 2. Flatness and birefringence were measured similarly to the case of Example 1 and listed in table 1.

TABLE 1

| | Thickness of small thickness region | Percentage of area of small thickness region | Flatness of disk substrate | Flatness of final disk | Difference in birefringence |
|---|---|---|---|---|---|
| Example 1 | 1.0 non-symmetry | 9.5 | 0 μm | 0 μm | 3 nm |
| Example 2. | 1.1 non-symmetry | 9.5 | 0 μm | 5 μm | 2 nm |
| Compara. Example 1. | 1.0 non-symmetry | 1.5 | 0 μm | 20 μm | 12 nm |
| Compara. Example 2. | 1.0 symmetry | 9.5 | 0 μm | 30 μm | — |

Example 4

Example 4 of the disk shown in FIG. 3 was manufactured from polycarbonate, wherein the diameter D1 of the outer periphery, diameter D2 of the inner periphery, thickness T1 in the recording area, thickness T3 of the small thickness region in the inner non-recording area, ratio (percentage) P1 of the area of the small thickness region with respect to the total area of one side of the disk substrate including the area of the central opening, and thickness T4 of the large thickness portion disposed between the outer periphery of the disk substrate and the radial position 1 mm apart therefrom are such that D1=120 mm, D2=15 mm, T1=0.6 mm, T3=0.55 mm, P1=6.3%, and T4=0.606 mm. The large thickness portion 1a was formed by cooling the cavity outer ring at a room temperature. The disk substrate had a surface roughness Ra=5 μm on the surface formed by the surface of the stamper in the annular region disposed between circles 23 mm and 35 mm apart from the disk center.

The disk substrate thus obtained was measured in its birefringence and flatness in terms of displacement, similarly to Example 1.

A 2000-angstrom thick Al film was formed on the Example 4 by sputtering onto the recording surface of the disk substrate (bottom surface as viewed in FIG. 3) to form a recording layer, which was coated with protective layer made of an acrylic ultra-violet ray curable resin having a 10 μm thickness, followed by coating of the opposite surface (top surface as viewed in FIG. 3) of the disk substrate with a 5-μm thick overcoat layer made of acrylic ultra-violet ray curable resin. The resultant disk was measured in its birefringence, similarly to Example 1.

Displacement of the final disk was measured with a non-contact laser displacement meter by measuring displacement from a reference point while rotating the disk at a 60 rpm constant speed. 6 points and 36 points are selected in the radial direction and circumferential direction, respectively, for the measurement in the recording area. These values are shown as the maximum displacements in the radial and circumferential directions. The results thus obtained are shown in tables 2 and 3.

Comparative Example 3

Comparative Example 3 of the disk substrate was manufactured similarly to Example 4 except for the thickness of 0.6 mm in the non-recording area which was equal to the thickness in the recording area in Comparative Example 3. The results are shown in tables 2 and 3.

TABLE 2

| | Birefringence | | | | | | | |
|---|---|---|---|---|---|---|---|---|
| Radius (mm) | 23 | 28 | 33 | 38 | 43 | 48 | 53 | 58 |
| Exmple | 12.8 | 18.6 | 15.6 | 12.3 | 8.2 | 6.5 | 4.5 | 5.2 |
| Com. Ex. | 45.2 | 36.8 | 28.6 | 22.3 | 15.2 | 12.3 | 5.6 | 6.5 |

TABLE 3

| | Configuration of disk substrate | | | | | |
|---|---|---|---|---|---|---|
| | Displacement ($\mu$m) of substrate | | Displacement ($\mu$m) after formation of films | | Displacement ($\mu$m) after bonding | |
| | Radial | Circumferential | Radial | Circumferential | Radial | Circumferential |
| Example. | 500 | 100 | 500 | 100 | 50 | 40 |
| Com. Example | 500 | 100 | 800 | 150 | 125 | 120 |

Example 5

Example 5 of the disk was manufactured similarly to Example 4 except for a thickness of 0.6 mm in the annular region of the disk substrate between the radial positions 7.5 mm and 11 mm adjacent to the central opening. The flatness and birefringence measured were similarly to those of Example 4, and the flatness exhibited 0 $\mu$m.

Examples and Comparable Examples thus manufactured proved the advantages of the present invention in reduction of warp occurring due to the film stress etc. in the final disk, the advantage being obtained by incorporating the small thickness region and the large thickness region both disposed in a specified range. The birefringence, which is generated due to the stress occurring in the internal of the disk substrate, changes its value depending on the stress generated during attachment of the central hub.

Since the above embodiments are described only for examples, the present invention is not limited to the above embodiments and various modifications or alterations can be easily made from the embodiments by those skilled in the art without departing from the scope of the present invention.

What is claimed is:

1. A molded disk substrate for use in manufacturing a recording disk comprising an outer non-recording area, an optical recording area, an inner non-recording area and a central opening area consecutively arranged from an outer periphery to a center of said disk substrate, said disk substrate having a first thickness in said recording area, a second thickness equal to 70 to 96% of said first thickness in a part of said inner non-recording area which part occupies 3 to 30% of an entire surface area of one side of said disk substrate including said central opening area, and a third thickness larger than said first thickness in a part of said outer non-recording area in the vicinity of said outer periphery whereby bith warping of the recording disk and the birefringence are reduced.

2. A disk substrate as defined in claim 1 wherein said recording area has two surfaces and wherein said part of said inner non-recording area has a first surface flush with one of the surfaces of said recording area and a second surface depressed from the other of the surfaces of said recording area.

3. A disk substrate as defined in claim 1 wherein said inner non-recording area has a thickness substantially equal to said first thickness between said part of said inner non-recording area and said central opening area.

4. A disk substrate as defined in claim 1 wherein said part of said inner non-recording area has a surface roughness Ra=0.5 $\mu$m over an area which is not less than 20% of the area of said inner non-recording area.

5. A disk substrate as defined in claim 1 wherein said part of said outer non-recording area is disposed between said outer periphery and a radial position 3 mm apart from said outer periphery, and said third thickness is larger than said first thickness by not lower than 10 $\mu$m.

6. The substrate of claim 1, wherein said disk has a reflective coating at said optical recording area.

7. The substrate of claim 1, wherein said disk has a flatness less than 20 $\mu$m and a birefringence less than 12 nm.

* * * * *

UNITED STATES PATENT AND TRADEMARK OFFICE
CERTIFICATE OF CORRECTION

PATENT : 5,987,003
DATED : November 16, 1999
INVENTOR(S): Shoji YOKOTA

It is certified that error appears in the above-identified patent and that said Letters Patent is hereby corrected as shown below:

On the title page, the Continuing Prosecution Application Information has been omitted. It should read as follows:

--[45] Date of Patent: *November 16, 1999--

-- [*] Notice     This patent issued on a continued prosecution application filed under 37 CFR 1.53(d), and is subject to the twenty year patent term provisions of 35 U.S.C. 154(a)(2).--

Signed and Sealed this

Fifteenth Day of May, 2001

Attest:

NICHOLAS P. GODICI

*Attesting Officer*     *Acting Director of the United States Patent and Trademark Office*